United States Patent [19]

Bardon

[11] Patent Number: 4,656,936
[45] Date of Patent: Apr. 14, 1987

[54] FRUIT AND VEGETABLE PEELER

[76] Inventor: Aubrey C. Bardon, 80 Heritage Hills, Tuscaloosa, Ala. 35406

[21] Appl. No.: 830,819

[22] Filed: Feb. 19, 1986

[51] Int. Cl.⁴ ............................................. A23N 7/00
[52] U.S. Cl. ....................................... 99/593; 99/584; 99/623; 241/100; 241/273.1
[58] Field of Search ................. 99/539, 540, 567, 584, 99/588, 590, 591, 593, 623; 426/481–483; 241/93, 100, 273.1

[56] References Cited

U.S. PATENT DOCUMENTS

| 515,394 | 2/1894 | Beuttel | 99/593 |
| 1,481,547 | 1/1924 | Garrette | 241/273.1 X |
| 4,055,308 | 10/1977 | Ackeret | 241/273.1 X |
| 4,214,715 | 7/1980 | Graham | 241/273.1 X |

FOREIGN PATENT DOCUMENTS

| 18188 | 6/1934 | Australia | 99/593 |
| 2380746 | 10/1978 | France | 99/593 |

Primary Examiner—Timothy F. Simone
Attorney, Agent, or Firm—Dowell & Dowell

[57] ABSTRACT

An automated fruit and vegetable peeler having a motor driven rotary cutter blade which is mounted in generally vertically spaced relationship with respect to a cutting guide opening which opening is adjustable so as to both regulate the depth of the cut made with respect to a particular fruit or vegetable and to enable varying sizes of fruit and vegetables to be peeled utilizing the device.

10 Claims, 9 Drawing Figures

U.S. Patent   Apr. 14, 1987   Sheet 1 of 2   4,656,936
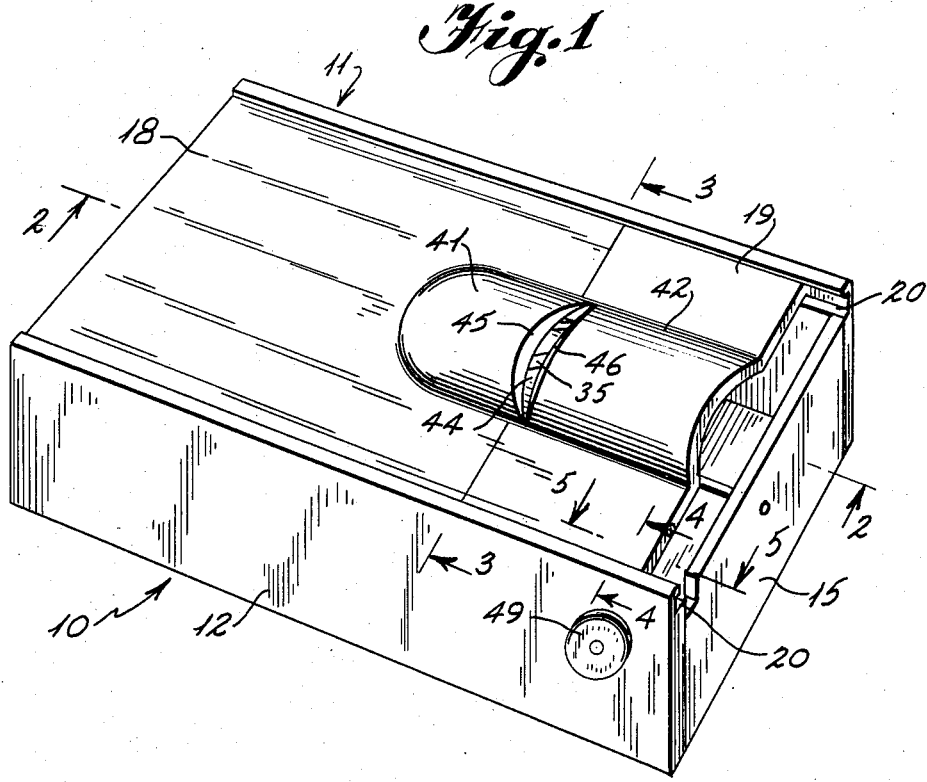
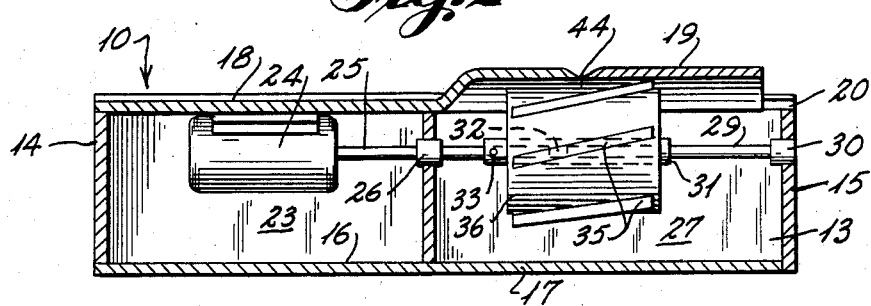
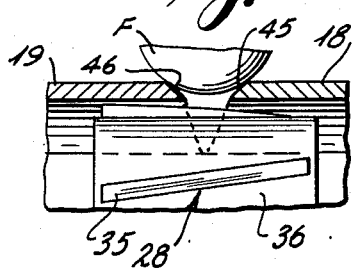
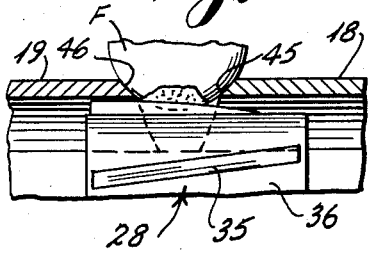

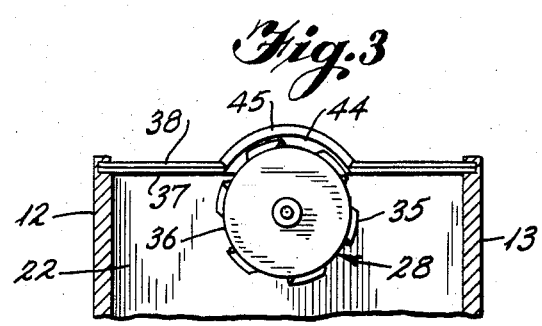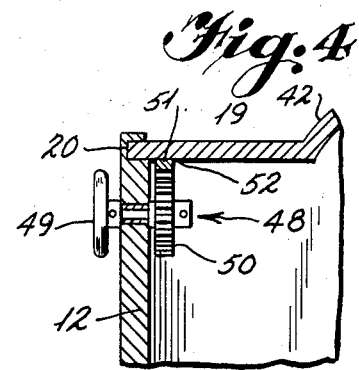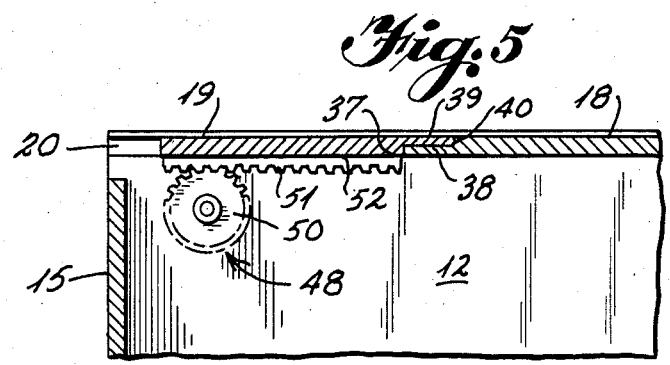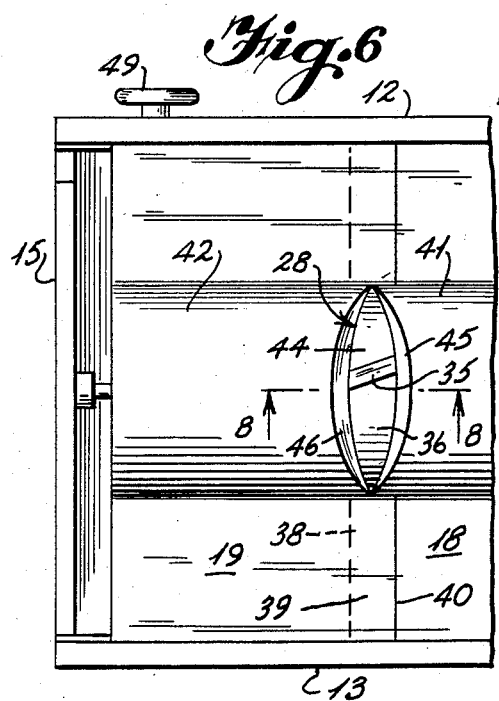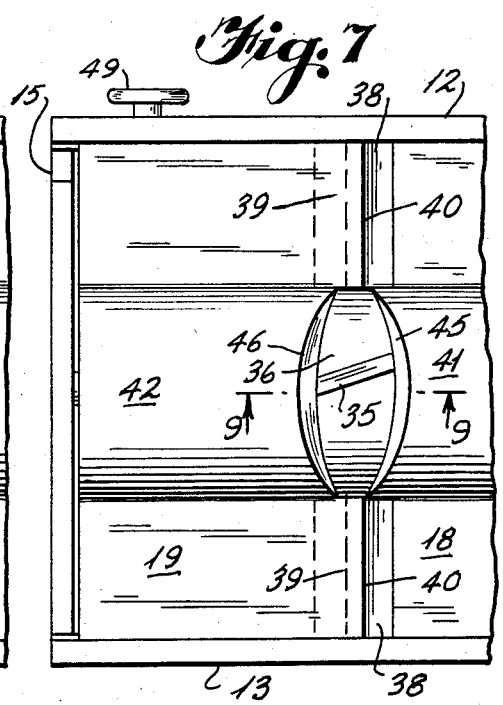

FRUIT AND VEGETABLE PEELER

BACKGROUND OF THE INVENTION

1. Field of the Invention

This invention is generally directed to food preparation devices and particularly to an automated fruit and vegetable peeler having a rotary cutting element which is mounted within an enclosed housing with the cutting elements being accessible through an opening created between relatively adjustable plates which are mounted in spaced relationship with respect to the cutting element. The relatively adjustable plates permit an adjustment to be made to allow variations in the depth of cut with respect to a particular fruit or vegetable and to permit the opening between the plates to accomodate a variety of sizes of fruits and vegetables being peeled utilizing the device.

2. History of the Prior Art

Heretofore, there have been many developments with respect to cutting mechanisms which are utilized in the culinary arts to aid in the preparation of comestible products. These devices are utilized to cut, shred, peel or otherwise prepare fruit and vegetables for serving or for cooking especially, as many fruit and vegetables must be prepared for serving or cooking by removing or cutting the outer peeling or skin therefrom.

Over the years, it has been the predominant practice to peel fruit and vegetables by hand or by use of hand held peeling devices. Such techniques and devices are not only slow and tedious to use but also require a great deal of physical effort to be exerted when preparing such foods for preparation or consumption. In addition, hand held slicing, peeling and cutting implements are inherently dangerous.

In order to make the preparation of foods such as fruits and vegetables less labor intensive and safer, various machines have been designed for use in the kitchen for use in removing the peelings from fruits and vegetables. In U.S. Pat. No. 1,481,547 to Garrette, a vegetable peeler is disclosed which is mounted to a countertop. The mechanism includes a rotor by which a cutting element in the form of an annular band carries cutting projections which are used to engage the peeling or skin of a fruit or vegetable which is held within an opening in a guard plate which is supported in spaced relationship from the rotary cutting elements. In the use of the device, the opening to the cutting blades is of a fixed size and is substantially larger in some instances than may be necessary and thereby may enable a person's fingers to accidentally pass therethrough into engagement with the cutting elements as the cutting element is rotated. In addition, there is no adjustment possible with respect to the spacing between the opening in the guard plate and the cutting element, therefore, the depth of the cut must be manually limited by holding the fruit or vegetable in relatively spaced relationship with respect to the cutting element. Thus, there is no means to insure a uniform depth of cut with respect to the fruit or vegetable especially when the fruit or vegetable is of a size to be wholly positioned within the opening in the guard plate. The Garrette structure, therefore, is generally not adequate for normal use because it does not provide means for adjusting the depth of cut with respect to the particular fruit or vegetable being peeled and further in that the enlarged opening into the cutting elements creates a hazardous condition which may lead to injury during the use of the peeling machine.

As the amount of skin or peeling which must be removed varies depending on the specific fruit and/or vegetable being peeled, it is of importance that any type of peeling machine permit a relative adjustment to be made to the cutting depth of the blades with respect to the fruit or vegetable so that the entire peel is removed without cutting, severing or wasting the meat of the fruit or vegetable as would be the case if too great a depth of cut is made with respect to such fruit or vegetable. It is also of importance to insure that the design of cutting or peeling machine be such as to insure the safety of the operator from accidental injury. Therefore, any open access to the cutting elements of such machinery should be restricted so as to permit only the fruit and vegetables to be acted upon by the cutting elements during the use of such machinery.

In U.S. Pat. No. 4,214,714 to Graham, a fruit cutting apparatus is disclosed having a rotating cutting element having associated therewith an adjustable funnel for directing food to be grated or cut into relationship with the rotating cutting elements. The apparatus is not designed for removing the peel from fruits and vegetables, as any fruit or vegetable placed within the funnel would be totally grated or sliced to pass through the opening between the funnel and the cutter, but does provide for a means for adjusting the distance between the food or material guide and the cutting elements. However, such adjustment is made at a point after which the cutting elements have engaged the material contained within the hopper or funnel so that any adjustment would have no effect on the depth of cut with respect to a whole fruit or vegetable being placed therein. In addition to the foregoing, the cutting elements are fully exposed outside of the cutting mechanism housing and could therefore be easily accidentally engaged by someone utilizing the device.

In U.S. Pat. No. 4,055,308 to Ackeret, another food cutting machine or mechanism is disclosed wherein various cutting elements may be selectively oriented into generally planar relationship with a food guide which is disposed in the upper portion of the housing of the cutting device. Although the cutting elements are spaced within a protective housing, there is no relative adjustment to permit the depth of cut to be varied between the cutting blades and the food guide, and therefore, the same depth of cut will be obtained for any type of fruit or vegetable passing over any one of the selected cutting elements.

SUMMARY OF THE INVENTION

This invention is directed to an automated fruit and vegetable peeler having a rotary cutting element which is mounted within a protective housing and which is selectively driven by an electric motor. The cutting element is positioned beneath adjustable food guide plates which are longitudinally movable with respect to the cutting element so as to permit a wider area or opening to be exposed to the cutting element relative to the upper surface of the housing. The opening into the housing is provided by arcuately tapered edge portions of the food guide plates which act to direct the fruit into relationship with the vertically spaced cutting element and which also serve to assist any fruit or vegetable being acted upon by the cutting element to rotate or roll within the opening thereby aiding in the removal of the peel or skin by continuously exposing varying surface portions of the fruit or vegetable to the cutting element. Manual adjusting means are provided for moving one of the food guide plates defining the opening above the cutting element so that the space between the tapered and arcuate guiding surfaces of the plates may be widened or narrowed depending upon the depth of cut that is necessary and/or the size or diameter of the fruit or vegetable to be cut. The housing may include a removable base or drawer so as to permit severed peelings contained therein to be easily removed therefrom and the housing cleaned for further use.

It is the primary object of the present invention to provide an automated fruit and vegetable cutter wherein the opening or access to the cutting elements may be adjusted so as to vary the depth of cut of the cutting element or elements with respect to a fruit or vegetable being acted on.

It is also an object of the present invention to provide a fruit and vegetable peeler wherein the cutting elements are rotated below a generally closed plate or platform which has an opening therein so as to permit selective exposure of the fruit or vegetable to the cutting elements and wherein the extent of the exposure may be varied in order to accomodate fruits and vegetables of different sizes with the opening being adjustable to a wider extent for larger vegetables and selectively narrowed for fruits or vegetables of a smaller size or diameter.

It is a further object of the present invention to provide a fruit and vegetable peeler or cutter wherein the cutting mechanism is generally wholly maintained within a protective housing with the only access directly to such cutting mechanism being through a narrow tapered opening in the upper portion of the housing so that the amount of exposure of the cutting mechanism is limited to minimize accidental injury to persons utilizing the cutting apparatus.

It is yet another purpose of the present invention to provide an automated peeling machine for fruits and vegetables wherein the machine includes a rotary cutting element which is mounted in spaced relationship below a fixed guide plate and a movable guide plate wherein the movable guide plate may be selectively adjustable to regulate the amount of blade exposure relative to the food supporting plates and wherein the food supporting plates will insure that the fruit and vegetables are maintained in generally spaced relationship from the cutting element except for those portions of the fruits or vegetables which are to be removed or peeled therefrom.

It is another object of the present invention to provide an automated machine for peeling fruits and vegetables wherein the machine not only provides a safe housing which encases the cutting elements to be used for peeling such fruits and vegetables but also one in which the access to the cutting elements may be regulated so as to adjust the depth of cut with respect to the cutting elements and also wherein such access is tapered so as to facilitate in the movement of the fruit or vegetables with respect to the cutting elements and to also insure the total removal of the peel or skin from the fruits or vegetables.

It is also an object of the present invention to provide an automated machine for enabling fruit and vegetables to be peeled wherein the cutting elements and the machine itself may be easily dismantled for convenience of cleaning and in such a manner that the motor which drives the cutting elements may be maintained in a protected environment with respect to articles of food or cleansing agents used to clean the machine.

BRIEF DESCRIPTION OF THE DRAWINGS

FIG. 1 is a perspective view of the fruit and vegetable peeling apparatus of the present invention showing the fixed and adjustable plates as they are spaced in vertical relationship with respect to the rotary cutting element which is operative within the housing of the invention.

FIG. 2 is a cross sectional view taken along lines 2—2 of FIG. 1 showing the relationship between the food supporting plates and the rotary cutting element.

FIG. 3 is a cross sectional view taken along lines 3—3 of FIG. 1.

FIG. 4 is an enlarged partial cross sectional view taken along lines 4—4 of FIG. 1 showing the adjusting mechanism for spacing the movable plate with respect to the fixed plate of the food peeling apparatus.

FIG. 5 is an enlarged partial cross sectional view taken along lines 5—5 of FIG. 1.

FIG. 6 is an enlarged partial top plan view of the invention of FIG. 1 showing the orientation of the guide plates in a first generally closed position with respect to the underlying cutting element.

FIG. 7 is a partial top plan view of the invention of FIG. 1 showing the adjustable cutter plate being spaced from the fixed guide plate so as to create an enlarged opening or access to the cutting elements of the invention.

FIG. 8 is a partial cross sectional view taken along lines 8—8 of FIG. 6.

FIG. 9 is a partial cross sectional view taken along lines 9—9 of FIG. 7.

DESCRIPTION OF THE PREFERRED EMBODIMENT

With continued reference to the drawings, the fruit and vegetable peeling machine 10 of the present invention is shown in FIG. 1 as including a housing 11 having side walls 12 and 13, spaced end walls 14 and 15, and first and second lower wall sections 16 and 17. The second lower wall section 17 may be removably mounted to the housing such as by being frictionally fitted or otherwise secured between the walls 12 and 13 and first lower wall portion 16 and end wall 15 for purposes which will be described in greater detail hereinafter. The upper portion of the housing is defined by a fixed food guide plate 18 which is generally longitudinally aligned with a movable food guide plate 19 which is mounted at each end within opposing grooves 20 provided along the inner portion of each of the side walls 12 and 13.

The housing is divided internally by an intermediate wall 22 which extends between the side wall portions 12 and 13 and the lower wall portion 16 and the upper fixed wall 18. The area between the end wall 14 and intermediate wall 22 defines a motor mounting chamber 23 in which an electric motor 24 is mounted. The motor includes a drive shaft 25 which extends through a bearing 26 provided through the intermediate wall 22 and extends into a second housing chamber which is defined as the cutting chamber 27.

A rotary cutting element 28 is normally oriented within the cutting section 27 with such rotary cutting element being mounted on a stub shaft 29 which extends centrally from the cutting element 28 into a bearing element 30 disposed within the end wall 15 of the housing. The stub shaft is fixedly mounted to a central hub 31 which extends through the cutting element 28 and which has an elongated opening 32 in the end thereof in which the remote end of the motor drive shaft 25 may be selectively inserted. In order to drive the hub 31 by the drive shaft 25, a pin 33 is placed between the members thereby binding the two in driving relationship with one another.

The particular size, shape and style of the cutting element 28 may vary depending upon the type of cut desired, however, each cutting element 28 will include at least one cutting blade 35 which is outwardly extended from the perimeter thereof. In the present disclosure, a plurality of equally spaced cutting blades 35 are disposed about the periphery of a generally cylindrical mounting member 36 which is carried by the hub 31. Each of the cutting blades is shown as being inclined at an angle with respect to the elongated axis of the cylindrical mounting member 36 of the cutting element so that the cutting blades 35 will have a tendency to shear any material which passes in contact with the blades as they are driven in a rotary motion by the motor 24.

As previously discussed, the upper surfaces of the fruit and vegetable peeler of the present invention includes a fixed plate 18 which is aligned with a movable plate 19. With particular reference to FIGS. 5-7, the fixed plate includes a leading edge 37 having a pair of flanges 38 extending outwardly along each side thereof. The flanges 38 are positioned in underlying relationship with corresponding flanges 39 associated with the leading edge 40 of movable plate 19. Each of the plates 18 and 19 is provided with a centralized upwardly extending convex portions 41 and 42, respectively, which are generally in longitudinal alignment with respect to one another and which provide clearance for the underlying cutting element 28. As shown in FIGS. 1 and 2, the convex surfaces not only create clearance for the rotary cutter 28 but also provide a physical barrier along the exterior of the housing which not only represents or identifies the presence of the cutting element therebelow but which restricts the movement of any object across the plane of the upper surface of the housing. With particular respect to FIG. 1, each of the plates 18 and 19 extends generally outwardly in a planar fashion from the raised portions 41 and 42 with the flanges 38 and 39 thereof always in overlapping relationship with respect to one another. An opening 44 is created between the central portions 45 and 46 of the opposing leading edges 37 and 40 in the area of the convex portions 41 and 42 in order to provide an access to the cutting blades 35 carried by the rotary cutting element 28.

As shown in the drawings, central portions 45 and 46 of the leading edges in the area of the convex portions are bevelled in an inclined relationship inwardly toward each other so that the lower portions thereof are spaced more closely than the upper portions. The central portions in effect form a V-shaped slot or groove which is generally arcuate or semi-circular along its length so as to follow the general contour of the underlying cutting element 28. The inclined surfaces of the central portions of the leading edges serve to direct the outer surface portion of a fruit or vegetable into relative contact with the cutting blades 35 carried by the cutter rotor 36.

With particular reference to FIG. 6, the opposed central portions 45 and 46 of the opposing edges 37 and 40 are shown as being brought into their closest relationship with respect to one another. In this position, the overlapping outwardly extending flanges 38 and 39 of the plates 18 and 19 are in abutting contact with one another thereby preventing relative motion of the plates toward one another. In this position, the edges define the narrowest slot, opening or access 44 to the cutting blades 35 of the cutting element 28. In the event the fruit or vegetable to be peeled using the cutter mechanism of the present invention will not fit within the slot 44 formed as shown in FIG. 6, an adjusting mechanism 48 is provided to move the plate 19 away from the plate 18 to create a wider opening 44', as shown in FIG. 7. By widening the space between the central edge portions 45 and 46, a fruit or vegetable placed within the opening 44' is allowed to drop deeper or closer into relationship with the cutting blades 35 of the cutting element 28.

Although various types of adjusting mechanisms 48 may be utilized to adjust the plate 19 with respect to the underlying cutting element, in the drawings, plate 19 is shown as being movable along the slots 20 in the sides 12 and 13 of the housing. As shown in FIGS. 4 and 5, an adjusting knob 49 is provided through the side wall 12 of the housing and engages a sprocket 50 which meshes with a longitudinally extending set of teeth 51 which are linearly attached or integrally formed with the lower edge and surface 52 of the plate 19. In this manner, rotation of the knob 49 will cause the sprocket 50 to engage teeth 51 thereby moving the plate 19 longitudinally with respect to the fixed plate 18. The design of the structure is such as to prohibit the plate 19 from moving more than a predetermined fixed distance with respect to the plate 18 so that the opening 44 provided between the central leading edge portions 45 and 46 is limited to a maximum which is considered safe for use for everyday purposes. In this regard, the leading edge flanges 38 and 39 will always remain in overlapping relationship with respect to one another, and therefore, the length of the flanges will determine the length of the greatest opening 44'. Although one type of adjusting mechanism is shown as moving plate 19 in relationship to plate 18, it should be noted that both plates may be movable with respect to one another in order to accomplish a variation in the size of opening 44 over or relative to the cutting blades 35 of the cutting element 28. It is this adjustable feature of the guide plates 18 and 19 which allows a greater depth of cut to be made with respect to a particular fruit or vegetable being peeled or skinned and also permits the cutting element to be adapted to use with various sizes of fruits or vegetables.

With particular references to FIGS. 8 and 9, the relative displacement of the central portions 45 and 46 of the leading edges of plates 18 and 19 is shown as regulating the depth or amount of penetration that a particular item will have with regard to the cutting blades 35 of the cutting element 28. In FIG. 8, the central portions 45 and 46 of the leading edges are positioned in close relationship to one another and may prevent a fruit or vegetable F from coming into contact with the cutting blades 35 being carried by the cutting element 28. By adjusting the position of the plate 19 with respect to plate 18 and therefore widening the opening 44 to a position similar to that shown in FIG. 7, a fruit or vegetable is allowed to extend or pass between the opposing edges 45 and 46 of the plates 18 and 19 to a position to be cut or sliced by the cutting blades. If properly adjusted, only the peeled or skinned portion of a fruit or vegetable will be within the path of the cutting blades 35 thereby insuring that only the peel or skin is removed from the fruit or vegetable during the use of the peeling apparatus of the present invention.

In the event a deeper cut is necessary or in the event a larger size of fruit or vegetable is to be peeled utilizing the apparatus of the present invention, the plates should be adjusted further apart in order to provide a wider guidance area or opening 44 between the edges 45 and 46 to facilitate the seating of the fruit or vegetable with respect to the cutting element.

Because the opposing central portions or edges 45 and 46 are bevelled with respect to one another, and when they are properly positioned or spaced with respect to one another, a fruit or vegetable disposed therebetween will tend to rotate on such surfaces or portions as the fruit is cut or peeled by the cutting blades 35. Therefore, the operator or person utilizing the present invention need only continually press slightly downwardly on the fruit or vegetable being cut while allowing the fruit or vegetable to spin or turn within the bevelled edges.

As the outer flanges 38 and 39 of the leading edges 37 and 40 of the plates 18 and 19 are disposed in overlapping relationship with respect to one another, those areas on each side of the cutting element 28 will be continuously blocked so as to prevent any accidental protrusion of an appendage or other article therebetween which might otherwise be accidentally cut or severed by action of the cutting blades 35. Therefore, only the cutting elements will be exposed through the opening 44. Because of the raised or convex configuration of the plates 18 and 19 adjacent the central edges 45 and 46, the operator will be physically warned or made consciously aware that the cutting element is disposed immediately beneath such portions.

As previously mentioned, the lower wall portion 17 of the unit is made removable in order to provide easy access for removing peels and other portions of fruit and vegetables being cut, trimmed or peeled by the cutting element of the present invention. With the lower portion 17 removed from its position, any waste material may be removed from the chamber 26 and thereafter the rotary cutting element 28 removed from its position on the motor drive shift 25 so that the cutting element may be cleaned and reinstalled for use at a later time. If preferred, access to the cutting element or to remove cuttings and the like may be by way of a drawer, tray or similar member disposed under the cutting element. In either case, the motor will be protectively housed within chamber 23 which may be made fluid tight in order to permit the entire peeling machine to be submerged in water for cleaning.

I claim:

1. An automated fruit and vegetable peeler comprising a housing, said housing having upper and lower surfaces, said upper surfaces including at least a first and second plate means, at least one of said first and second plate means being movable with respect to the other of said plate means, motor means disposed within said housing, said motor means having a drive shaft extending through said housing, a rotary cutting means mounted to said drive shaft of said motor means and spaced below said first and second plate means of said upper surface of said housing, said first and second plate means being selectively adjustable so as to create an opening therebetween in vertically overlying relationship with said cutter means, whereby a fruit or vegetable may be maintained on said first and second plate means with a portion thereof extending through said adjustable opening therebetween and into contact with said rotary cutting means.

2. The automated fruit and vegetable peeler of claim 1 in which said first and second plate means include opposing edge portions, at least a section of each of said opposing edge portions of said first and second plate means having generally arcuately shaped and inclined wall portions, said inclined wall portions serving to guide a fruit or vegetable into contact with said rotary cutting means.

3. The automated fruit and vegetable peeler of claim 2 in which said housing includes a removable base portion, said removable base portion being disposed vertically below said cutting means so as to provide access thereto.

4. The automated fruit and vegetable peeler of claim 2 in which each of said first and second plate means includes a generally centrally located convex upper surface portion, said inclined wall portions being formed along said convex upper portions of said first and second plate means so as to be in opposing relationship with respect to one another, said opposing edge portions of first and second plate means being extending outwardly along either side of said convex surface portions.

5. The automated fruit and vegetable peeler of claim 4 in which said housing includes an intermediate wall portion disposed between said upper and lower surfaces thereof, side wall portions, and end wall portions, said intermediate wall portion dividing said housing into first and second sections, said first section of said housing enclosing an electrical drive motor having a drive shaft, said drive shaft extending through said intermediate wall portion to said cutting means, said cutting means being positioned within said second section of said housing.

6. An automated fruit and vegetable peeler of claim 5 in which said housing includes a removable plate means disposed into said second section thereof for facilitating access thereto.

7. The automated fruit and vegetable peeler of claim 2 in which said cutting means includes a generally cylindrical member having a plurality of blades extending outwardly therefrom, said blades being in vertically spaced relationship with said opening between said first and second plate means.

8. An automated fruit and vegetable peeler having a housing, said housing having upper and lower surfaces, spaced side wall portions and end wall portions, said upper surface having first and second plate means, at least one of said plate means being longitudinally movable with respect to the other of said plate means, each of said plate means having opposing leading edge portions, at least a portion of said forward leading edge portions of said first and second plate means being inwardly tapered toward one another, an opening formed between said inwardly tapered portions of said first and second plate means, means for adjusting one of said first and second plate means longitudinally with respect to the other in order to vary the size of said opening, a motor contained within said housing, said motor having a drive shaft extending therefrom, a rotary cutting element carried by said drive shaft in spaced vertical relationship below said opening between said first and second plate means, and an access disposed through said housing to permit access to said cutting element.

9. The automated fruit and vegetable peeler of claim 8 in which said opposing leading edge portions of said first and second plate means include outer flange portions which are maintained in overlapping relationship with respect to one another on opposite sides of said opening.

10. The automated fruit and vegetable peeler of claim 9 in which said first and second plate means include convex surface portions, said inwardly tapered portions of said first and second plate means being formed along said convex surface portions so that said inwardly tapered portions are generally arcuate along their length.

* * * * *